United States Patent Office 3,471,414
Patented Oct. 7, 1969

3,471,414
CASTABLE NEUTRON SHIELD
Kenneth T. Faler, Pocatello, Idaho, assignor to the United States of America as represented by the United States Atomic Energy Commission
No Drawing. Filed Oct. 15, 1968, Ser. No. 767,821
Int. Cl. G21c 11/06; C11d 9/04
U.S. Cl. 252—478       3 Claims

ABSTRACT OF THE DISCLOSURE

A composition of matter useful as a neutron shield consisting of a mixture of lithium-6 carbonate or hydroxide and a long-chain fatty acid or mixture of fatty acids.

Background of the invention

This invention relates to a new composition of matter which is useful as a neutron shield. In more detail, the invention relates to a composition of matter which is capable of moderating and stopping neutron beams. In still more detail, the invention relates to a neutron shield material that can be cast and recast into shape or carved, machined or drilled and is thus suitable for making odd shapes of neutron shielding. The invention also relates to a neutron shield material that provides an exceptionally low gamma-ray background.

Shielding against penetrating raditaion hs been a matter of some concern ever since the discovery of X-rays and development of the nuclear reactor for commecial, military and research use within the last decade has led to intense activity within this field. While most of this activity has been directed toward the perfection of massive shields for surrounding a nuclear reactor or other high-intensity source of radiation, a continuing need exists for shielding material that can be used for local shielding. For example, special shielding may be required around instruments exposed to a reactor environment, in a beam tube experiment or around a neutron source. Typically, such shielding will be of an odd or unusual shape. Materials used for this purpose heretofore, such as slabs of fused lithium salts or salt crystals in containers with added organic moderator, have been less than completely satisfactory.

Summary of the invention

The invention accordingly relates to a new shielding material consisting of a soap-like mixture of lithium-6 carbonate or hydroxide and a long-chain fatty acid. Specifically, a mixture of lithium-6 carbonate and stearic acid in a proportion of between four parts and six parts by weight of stearic acid to one part by weight of lithium-6 carbonate has been found satisfactory. This material can be cast and recast into any desired shape. The stearic acid slows down neutrons striking the shielding material and the slow neutrons thus formed are absorbed in lithium-6 to form stable lithium-7. Since there is no gamma-ray emission from this reaction, the gamma-ray background is exceptionally low when using this material.

Description of the preferred embodiment

Shielding material has been prepared containing between four parts and six parts by weight of stearic acid to one part by weight of lithium-6 carbonate. As the ratio increases from 4:1 to 6:1, the resulting product changes from a rather hard, brittle substance to a much softer soap-like material which is easier to machine. The melting point also decreases as a function of the acid concentration. The melting point of a rather low acid batch is above 200° C.

Lithium hydroxide may also be used in place of lithium carbonate and may in fact be better. Other chemical compounds of lithium, if they can be used at all, would be expected to be poorer.

Any long-chain fatty acid or mixture thereof can be used in place of stearic acid. By proper selection of the fatty acid a wide range of physical properties for the final product can be attained.

In the work actually performed to date, "moist" stearic acid was used. While it is not essential, it is desirable to add a little moisture to speed up initiation of the reaction. The amount is not critical and the moisture may be omitted completely, particularly since water is formed in the reaction.

Neutron shields formed of lithium-6 carbonate and stearic acid have been used for shielding counters near neutron beams in the Materials Testing Reactor at the National Reactor Testing Station, Arco, Idaho. A sample of this material was used as a beam stop in a beam facility at the Materials Testing Reactor. The gamma-ray flux was 9.84 roentgens/hour. An estimation of the total exposure time indicates an approximate integrated dose of $1.5 \times 10^4$ roentgens over the 15 weeks during which the beam stop was used. In addition, there was an exposure of about $0.5 \times 10^4$ rem. from neutrons. There was no evidence of deterioration noted in the sample.

The sample had excellent mechanical properties, was readily cast into shape, and can also be easily machined, carved, drilled, etc. to provide intricate shapes frequently needed. In addition, the cost of lithium-6 carbonate or hydroxide is relatively low and the material can be reused by remelting. No other shielding material with the efficiency and versatility of this product is known.

It will be understood that the invention is not to be limited to the details given herein but that it may be modified within the scope of the appended claims.

The embodiments of the invention in which an exclusive property or privilege is claimed are defined as follows:

1. A composition of matter suitable for use as a neutron shield comprising a mixture of lithium-6 carbonate or hydroxide and a long-chain fatty acid or mixture of long-chain fatty acids, the proportion of fatty acid or acids to lithium-6 carbonate or hydroxide in said mixture being at a value wherein said mixture is readily formable and is an effective neutron shield.

2. A composition of matter according to claim 1 comprising a mixture of lithium-6 carbonate and stearic acid.

3. A composition of matter according to claim 2 wherein the proportion by weight of stearic acid to lithium-6 carbonate is between 4 and 6 to 1.

References Cited

UNITED STATES PATENTS 3,361,684   1/1968   Chvatal _____ 252—478

OTHER REFERENCES

Nuclear Instruments and Methods, Rustad et al., Fused $Li_2{}^6CO_3$ for Absorbing Slow Neutrons in Collimating Systems, vol. 33, No. 1, 1965, pp. 155–156.

CARL D. QUARFORTH, Primary Examiner

MELVIN J. SCOLNICK, Assistant Examiner

U.S. Cl. X.R.

176—93; 250—108